Jan. 12, 1926.  1,569,150
J. E. STEVENS
AUTOMOBILE SPRING CONTROL AND REPAIR DEVICE
Filed August 25, 1924    2 Sheets-Sheet 1
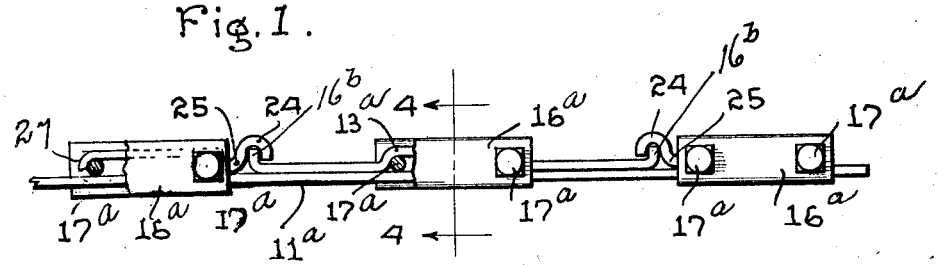
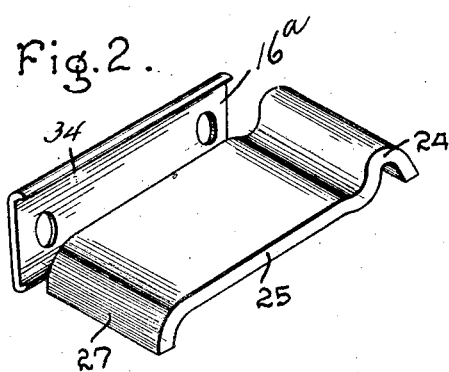
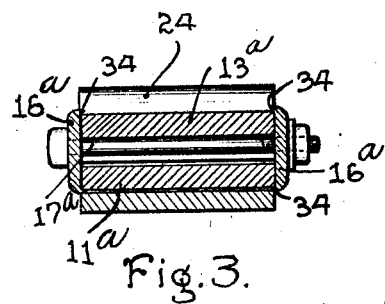
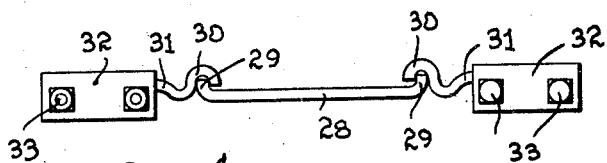
Inventor
Jesse E. Stevens,
By Frank A. Ackerman,
Attorney.

Jan. 12, 1926. 1,569,150
J. E. STEVENS
AUTOMOBILE SPRING CONTROL AND REPAIR DEVICE
Filed August 25, 1924 2 Sheets-Sheet 2
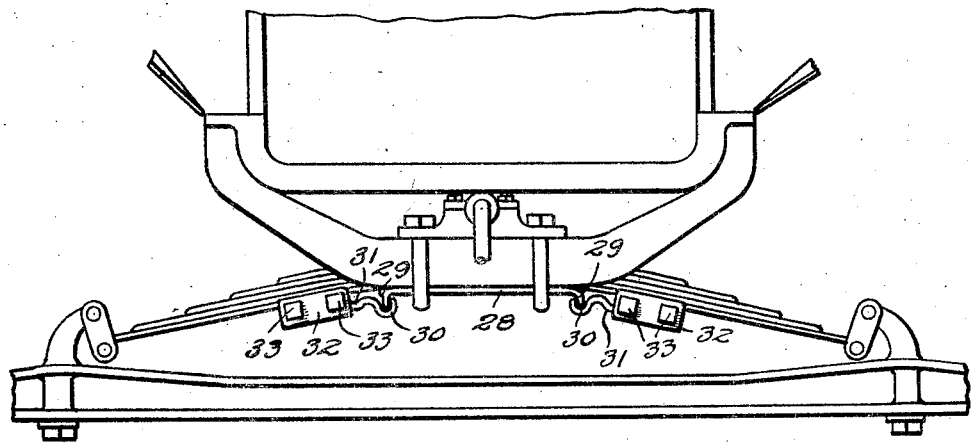
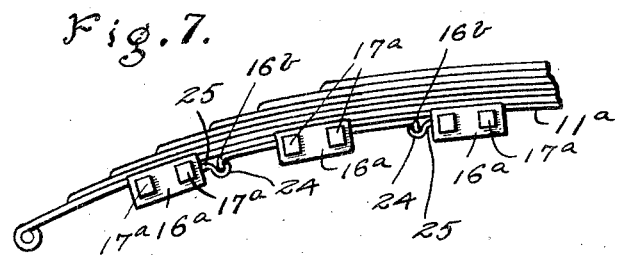
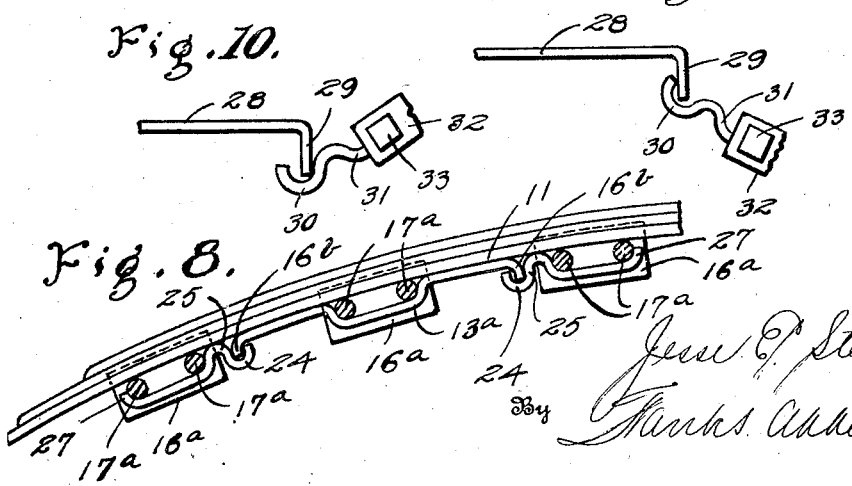

Patented Jan. 12, 1926.

1,569,150

UNITED STATES PATENT OFFICE.

JESSE E. STEVENS, OF LEBANON, INDIANA.

AUTOMOBILE SPRING CONTROL AND REPAIR DEVICE.

Application filed August 25, 1924. Serial No. 734,107.

*To all whom it may concern:*

Be it known that I, JESSE E. STEVENS, a citizen of the United States of America, and resident of Lebanon, in the county of Boone and State of Indiana, have invented certain new and useful Improvements in Automobile Spring Control and Repair Devices, of which the following is a specification.

This invention relates to spring controlling and repairing devices especially adapted for use on springs of automobiles, and the said invention has for an object the provision of novel means for modifying the action of springs on automobiles, in retarding their rebound, in preventing fractures of springs due to such rebound, while at the same time easing the riding conditions of such springs in order that the device will serve as a snubber or shock absorber.

It is an object of this invention to produce a device of the character indicated which can be installed on springs now in common use, without changing or modifying the construction of such springs, and it is the purpose of this invention to produce a control of the character indicated, having means for anchoring it at the edges of said springs, whereas the control operates in contact with the main leaf or leaves of the said spring.

It is an object of this invention furthermore to produce a spring controlling device which will serve as a spring strengthening adjunct, and it may furthermore be employed to brace the leaves of springs that have been fractured.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in side elevation of a device embodying the invention;

Figure 2 illustrates a perspective view of some of the elements embodied in Fig. 1;

Figure 3 illustrates a sectional view through the spring and invention on the line 4—4 of Fig. 1.

Figure 4 illustrates a view in elevation of a slightly modified control;

Figure 5 illustrates a sectional view of one of the clamps;

Figure 6 illustrates a view in elevation showing one type of the invention applied to a spring;

Figure 7 illustrates a similar view showing another type of the invention applied to a spring;

Figure 8 illustrates a sectional view thereof;

Figure 9 illustrates an enlarged view of the joint between sections of the reinforcing device; and Figure 10 illustrates a similar view with parts in different positions of adjustment.

In these drawings the device is shown as applied to a leaf $11^a$ of the spring and this device is intended for use on short springs or on springs which have to be braced or repaired remote from the axle or clips by which the spring is secured to the automobile. In this embodiment of the invention three sets of clamping plates are preferably used.

The control and repair device of this invention comprises a main plate $13^a$ which is curved or offset between its ends, whereas the remaining portion of the said plate is intended to lie in contact with the surface of the leaf $11^a$. The offset portion of the plate $13^a$ produces a clearance for the reception of bolts $17^a$ which extend between the plate $13^a$ and the leaf $11^a$ and through the clamping plate $16^a$ for binding the clamping plates into engagement with the edges of the leaf $11^a$ of the spring and the said plate $13^a$. The ends of the plate $13^a$ have angularly disposed terminals $16^b$ which are hinge members coacting with the curved ends 24 of the plates 25 which are retained in associated relation to the leaf $11^a$ of the spring by bolts $17^a$ similar to those employed in connection with the central clamp. Each plate 25 has its end 27 remote from the hinge 24 curved to partially embrace one of the bolts $17^a$, and when the parts are assembled, this curved end serves to prevent the clamping plate $16^a$ from moving with respect to the leaf $11^a$ of the spring.

The device is to be used where there is no clip for holding the parts in engagement with the leaves of the springs, whereas the form shown in Fig. 1 is employed in connection with clips and fastenings by which the springs are secured to the automobile.

The clamping plates 16ª have angularly disposed edges or flanges 34 which are preferably shaped with rather sharp edges which will wedge between the leaves of springs or embrace the edges of plates to aid in preventing movement of the said clamping plates. The exact shape of the wedges may be changed to suit particular requirements, but in Fig. 3 the lower edges of the clamping plates are shown as wedged between the leaves of the springs and as embracing the upper edge of the plate 13ª, it being understood that this view is taken on the section line 4—4 of Fig. 1.

In the modification shown in Fig. 4, the plate 28 is intended to be used in connection with clips by which springs are secured to axles or the like, and the said plate 28 has ends 29 which are intended to form hinge connections with the ends 30 of the plates 31. The clamping plates 32 are the same in this form as the clamping plates 16 or 16ª and they are held in engagement with the plates 32 and in engagement with the leaf of a spring when the device is installed on a spring by the bolts 33.

It will be obvious from an inspection of the drawing and from the foregoing description that the elements may be of any appropriate length or width and, of course, the length or width will be different to adapt it for use in connection with springs of different makes of automobiles, but one skilled in the art will, it is thought, understand how the device will operate in conjunction with springs and they will appreciate also that it will serve as a strengthening device for the spring to modify its action and retard its movement under strain, and they will also understand how the device could be used for bridging fractures in springs to strengthen the same and constitute an emergency repairing device, so that the inventor does not wish to be limited with respect to the proportions. It will also be understood, as stated, that the wedging effect of the angularly disposed edge 34 of the plates may be increased or diminished according to the length of the flange and the taper of the surfaces thereof.

The illustration shown in Fig. 7 shows the invention applied to a half spring, and preferably when it is so employed, it should be applied close to that end of the spring which is connected to the shackle, although, of course, its relation to the end of the spring would depend upon the length of the spring, its strength, etc.

In Figs. 9 and 10 there is illustrated the action of the invention when the springs are flexed. This illustration is somewhat exaggerated, but it will be seen that when sections of the device oscillate with relation to each other, the interlocked or interengaging parts of the plates pull against each other, as in Fig. 9, or thrust each other, as in Fig. 10, according to the direction of movement of the spring.

By referring to Figs. 6 and 7, the action of the joints or interengaging parts of the device will be understood and the advantages appreciated.

The contacting ends of the several plates are arranged to interhook or interengage each other with what might be regarded as substantially a knuckle joint, but any interlocking hinged connection between the plates themselves without the intervention of pivots or the like would be the substance of this invention.

I claim:

1. In a control for springs of automobiles, stiffening plates adapted to be applied to the main leaves of a spring, the said control having interengaging hook-like ends, and means for securing the elements to the spring.

2. In a control and repair device for springs of automobiles, a relatively stiff plate adapted to engage the surface of a spring, an element engaging the spring at each end and interlocking therewith and oscillatable one on the other, clamping plates engaging the edges of the elements and the edges of the spring, and means for drawing the clamping plates into engagement with the elements and spring.

3. In a control and repair device for springs, a plate having shoulders at its ends, coacting plates, each of which interlocks with one of the shoulders of the first mentioned plate, and clamping elements engaging the edges of the coacting plates and a spring leaf for retaining the controlling device on the spring.

4. In a spring control and repair device, a plate adapted to lie on the surface of the leaf of a spring, plates each having a substantially interhooked hinged connection at their ends with the ends of the first mentioned plate, clamping plates for securing the first mentioned plate to the spring, and clamping plates adapted to embrace the edges of the second mentioned plates and a spring leaf for securing the said second mentioned plates to the spring.

5. In a spring control and repair device, a plate adapted to engage the leaf of a spring, end plates having interengaging ends forming hinged connection with the ends of the first mentioned plate, and clamps embracing the edges of the second mentioned plates and adapted to embrace the leaf of a spring for retaining the parts in assembled relation to the leaf of a spring.

JESSE E. STEVENS.